United States Patent [19]

Leorat

[11] Patent Number: 4,633,985

[45] Date of Patent: Jan. 6, 1987

[54] CONTROL OF THE SUPPLY PRESSURE OF A HYDRAULIC ACTUATOR

[75] Inventor: François Leorat, Versailles, France

[73] Assignee: Regie Nationale des Usines Renault, Boulogne Billancourt, France

[21] Appl. No.: 592,294

[22] Filed: Mar. 22, 1984

[30] Foreign Application Priority Data

Mar. 22, 1983 [FR] France ................. 83 04636

[51] Int. Cl.[4] .......................................... F16D 47/06
[52] U.S. Cl. ................................. 192/0.055; 74/866;
74/867; 192/0.032; 192/0.076; 192/3.31; 192/103 R
[58] Field of Search .............. 192/0.032, 0.033, 0.055, 192/0.076, 0.094, 0.096, 3.31, 3.58, 103 R; 74/866, 867

[56] References Cited

U.S. PATENT DOCUMENTS

| | | | |
|---|---|---|---|
| 3,765,271 | 10/1973 | Dach et al. | 74/731 |
| 3,817,358 | 6/1974 | Hess | 192/0.033 |
| 3,859,873 | 1/1975 | Miyauchi et al. | 74/867 |
| 3,904,007 | 9/1975 | Braun et al. | 192/0.076 |
| 4,081,065 | 3/1978 | Smyth et al. | 192/0.076 |
| 4,282,947 | 8/1981 | Kemper | 180/165 |
| 4,331,045 | 5/1982 | Piech et al. | 74/867 |
| 4,343,387 | 8/1982 | Hofbauer | 192/0.076 |
| 4,351,205 | 9/1982 | Fischer | 74/866 |
| 4,363,389 | 12/1982 | Zaunberger et al. | 192/0.076 X |
| 4,401,200 | 8/1983 | Heidemeyer et al. | 192/0.076 |
| 4,428,467 | 1/1984 | Hiramatsu | 192/3.31 |
| 4,497,397 | 2/1985 | Windsor et al. | 192/0.076 |
| 4,509,625 | 4/1985 | Tellert | 192/0.033 |
| 4,514,811 | 4/1985 | Daubenmier et al. | 192/0.076 X |

FOREIGN PATENT DOCUMENTS

| | | | |
|---|---|---|---|
| 1234304 | 10/1960 | France . | |
| 2017651 | 5/1970 | France . | |
| 2233893 | 1/1975 | France . | |
| 2292895 | 6/1976 | France . | |
| 2402128 | 3/1979 | France . | |
| 52-5117 | 1/1977 | Japan | 192/0.033 |
| 52-9231 | 1/1977 | Japan | 192/0.055 |
| 57-18819 | 1/1982 | Japan | 192/3.58 |
| 57-12128 | 1/1982 | Japan | 192/3.31 |
| 57-77232 | 5/1982 | Japan | 192/0.032 |
| 2042658 | 9/1980 | United Kingdom . | |

Primary Examiner—Kenneth J. Dorner
Assistant Examiner—Dwight G. Diehl
Attorney, Agent, or Firm—Oblon, Fisher, Spivak, McClelland, & Maier

[57] ABSTRACT

A device for controlling the supply pressure of a hydraulic actuator for an automatic transmission of an automobile. A pressure modulator varies the hydraulic pressure depending on the output of a controller. The controller receives input information on engine speed, turbine speed, engine load and vehicle speed. The transmission is controlled to be disengaged when the automobile is stopped, and reengaged smoothly.

3 Claims, 5 Drawing Figures

CONTROL OF THE SUPPLY PRESSURE OF A HYDRAULIC ACTUATOR

BACKGROUND OF THE INVENTION

1. Field of the Invention

This invention relates generally to the control of the supply pressure of a hydraulic actuator, and more particularly to a control for the supply pressure of a hydraulic actuator of automatic transmission for motor vehicles.

2. Description of the Prior Art

According to the prior art, standard automatic transmissions, equipped with a coupling or torque converter, are so designed that, when the vehicle is in forward (or reverse) gear and the engine is running, the transmission of the engine torque to the wheels is not interrupted, even when the vehicle is stopped. This results in a certain number of consequences, some of which can be classed as advantages of this type of transmission, but others can be considered as drawbacks; moreover, some of these advantages can become disadvantages because of driving conditions and vice versa.

This lack of interruption of the torque between the engine and wheel is reflected, when the vehicle is stopped with the engine idling, by a drag torque, which has a magnitude which depends on the characteristics of engine and the coupling element (torque converter or coupling), which gives the vehicle a spontaneous tendency to creep. This tendency to creep can be considered as favorable to the extent that:

it allows smooth, exact movements of the vehicle at very low speed (parking maneuvers, for example);

it prevents the vehicle from rolling back when starting on a moderate grade.

On the other hand, it constitutes an undeniable drawback to the extent that:

it makes it necessary to keep the foot constantly on the brake to keep the vehicle still after stopping on a level road;

it makes it necessary to set the idle higher than would be necessary for a true "neutral," which, in city traffic, leads to considerable consumption at each stop of the vehicle with either a gasoline or diesel engine;

the lack of interruption of the torque between the engine and wheels puts the entire corresponding kinematic linkage under mechanical stress, subjects it to vibrational stressing coming from the engine; this results in shaking that is often unacceptable in the passenger compartment, especially for vehicles equipped with a diesel engine.

In view of these phenomena, the need has been felt for a device that can be engaged at will by the driver, a device that automatically "disengages" the transmission each time the vehicle is stopped and "reengages" it with gradually at each restarting. Simply designed devices are known which correctly assure the function of disengaging the transmission, upon stopping, by cutting off the supply of the oil to the cylinder which assures locking of the input friction element of the transmission; but these devices do not take into account various speed parameters of the automobile (engine, turbine of the coupling element, vehicle). This results in a free wheeling effect that is more or less undesirable and in any case uncontrollable, and a non-gradual return to torque. Actually, at the moment of reengagement, when the driver presses on the accelerator, the cylinder is resupplied with pressure without particular care and with no relation to the change of the engine speed so that coupling may be abrupt, premature or late (causing racing of the engine).

SUMMARY OF THE INVENTION

Accordingly, one object of this invention is to provide a novel control for the supply pressure of a hydraulic actuator.

Another object of this invention is to provide a new and improved control for the disengagement and reengagement of an automotive automatic transmission.

A further object of this invention is to provide a new and improved control for the supply pressure of the hydraulic actuator of the automatic transmission of an automobile which reengages the transmission gradually without jerkiness, shaking or racing of the engine.

Briefly, these and other objects of the invention are achieved by providing a systematic servocontrol of the locking capacity of the cylinder of the transmission input element based on the instantaneous conditions of the speed of the engine, of the turbine of the coupling element and of the vehicle. This invention fits particularly advantageously into transmission monitoring/control electronic or microprocessor systems, but it can be associated with any other type of monitoring system.

For this purpose, the control of the supply pressure of a hydraulic actuator according to the invention comprises a pressure modulator of the type closed by a lack of current from a group of control. This said group of controls can be operated by an outside means and receives data on engine speed $\omega_m$, turbine speed $\omega_T$, engine load $\alpha_c$ and vehicle speed $V_v$.

According to a preferred embodiment of the invention, the pressure control of a hydraulic actuator includes the measurement of the slippage $\Delta\omega = \omega_m - \omega_T$ which is used to synthesize the control signal of a pressure modulator to position the cylinder of the hydraulic actuator in the immediate vicinity of the mating travel of the linings.

This pressure control is possible only when magnitudes $\alpha_c$ and $V_v$ are simultaneously less than the respective thresholds of certain preset values.

According to a preferred embodiment of the invention, the supply pressure control of a hydraulic actuator consists in comparing the slippage $\Delta\omega$ sequentially with two threshold values $\delta\omega$ and $\epsilon$:

If $\Delta\omega_1 = \delta\omega - \Delta\omega$ is negative, there is a generation of a large gain correction signal $\delta = \delta(\Delta\omega_1)$, modifying the control signal of the pressure modulator.

If $\Delta\omega_1 = \delta\omega - \Delta\omega$ is positive, there is a comparison with a second threshold value $\epsilon$, which is less than $\delta\omega$, and a generation of a small gain correction signal $\delta = \delta(\Delta\omega_2)$, where $\Delta\omega_2 = \epsilon - \Delta\omega$.

if $\Delta\omega < \epsilon$, the correction signal $\delta$ is taken as equal to 0.

Correction signal $\delta$ acts on a device for incrementing the control signal of the pressure modulator.

According to a preferred embodiment of the invention, the control of the supply pressure of a hydraulic actuator consists further in that the time of activating the device is metered and compared with a threshold value of preset time $t_{max}$. When the lapsed time exceeds $t_{max}$:

if the first threshold is not crossed, i.e. if $\Delta\omega > \delta\omega$, a warning signal is released and full pressure of the hydraulic actuator is resupplied;

if the slippage $\Delta\omega$ is between the first and second threshold, i.e., if $\epsilon < \Delta\omega < \delta\omega$, the device according to the invention stops the incrementing of the control signal of the modulator and increments the second threshold to a third threshold value $\delta\omega_1$, intermediate between the first and second thresholds;

if the slippage $\Delta\omega > \delta\omega_1$, a warning signal is released and full pressure of the hydraulic actuator is resupplied;

if slipping $\Delta\omega < \delta\omega_1$, this slippage value becomes the new second threshold, and time t is reinitialized to zero.

According to a preferred embodiment of the invention, the control of the supply pressure of a hydraulic actuator further consists, upon disappearance of the stop disengagement order, of a return to full supply pressure made according to a preset law as a function of time.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

The control device of the present invention can either be automatically put into operation when certain driving parameters occur or on order from the driver *and* when these same parameters occur.

In a nonlimiting way, it is possible to envisage that the device is put into operation if simultaneously:

the speed $V_v$ of the vehicle drops below a threshold valve $V_{lim}$;

the position of the element for regulating the engine fuel intake is that corresponding to idling; this position $\alpha_c = 0$ will be noted.

If $V_{lim} \approx 0$, a stop disengagement without a notable freewheeling effect is obtained, but that effect can be obtained by selecting for $V_{lim}$ a non-zero value considered as desirable. The principle of the invention takes into account the action characteristics of a usual cylinder assuring the locking of the input element of an automatic transmission.

DESCRIPTION OF THE PREFERRED EMBODIMENTS

Figure 1:
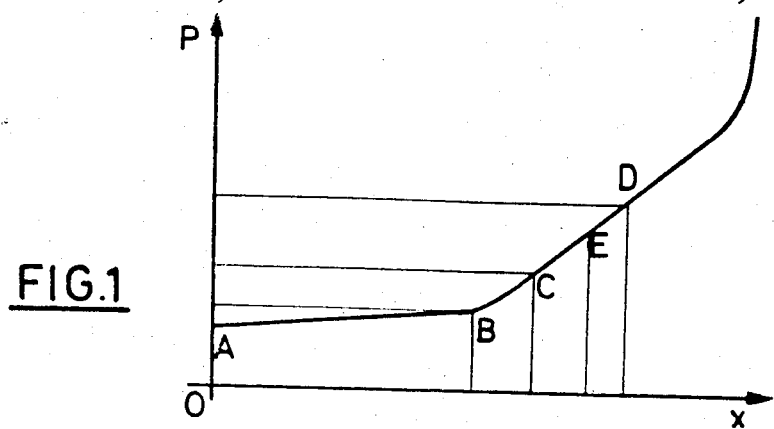
FIG. 1 is a graph of the pressure/travel characteristic of the cylinder of the transmission input element.

Referring now the drawings, wherein like reference numerals designate identical or corresponding parts throughout the several views, and more particularly to FIG. 1 thereof, wherein the pressure/travel characteristic of cylinder is shown. Segment AB of this characteristic represents the dead travel during which the input element does not transmit any appreciable torque other than the residual drag torque of the friction linings, while the transmissible torque increases linearly with the supply pressure of the cylinder along portion BD of this characteristic. Point D corresponds to the equilibrium position of the cylinder for full supply pressure, with the engine idling and in gear. As the pressure rises in the cylinder and the transmissible torque $C_T$ increases, the difference in speed or amount of slippage $\Delta\omega = \omega_m - \omega_T$ between the impeller and turbine of the coupling element increases correlatively with $C_T$ according to the curve of FIG. 2 in which:

point M corresponds to residual slippage $\Delta\omega_1$ with the cylinder totally unlocked;

point N corresponds to slippage $\Delta\omega$ at the moment of mating of the friction linings;

point R corresponds to $\omega_T = 0$, or $\Delta\omega = \omega^R_m R$ engine idling speed. From this point the cylinder is sufficiently locked to allow transmission of the torque $C_T$ without slippage of the friction element.

The purpose of the invention is to make it possible, in the "stop disengagement" phase, to position the cylinder at point B of its characteristic—and not at point A as is currently achieved by known devices—by servo-control of the position of the cylinder at B to the value of the slippage $\Delta\omega$ at N. The positioning of the cylinder at point B makes it possible, when the stop disengagement order ($\alpha_c = 0$, for example) disappears, to avoid having to go through the entire dead travel region AB of the cylinder, during which time, since no torque is transmitted, the engine speed $\omega_m$ can increase without control. With the prior art, to take up the "lost time" during dead travel AB, it is necessary to perform an energetic coupling on the friction element, thus imparting an unpleasant jerk to the vehicle.

Figure 3:
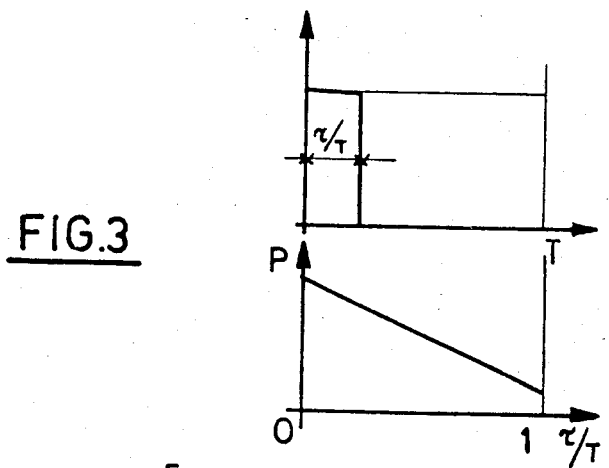
FIG. 3 is a graph of the characteristic of the solenoid valve modulating the supply pressure of the cylinder.
Figure 5:
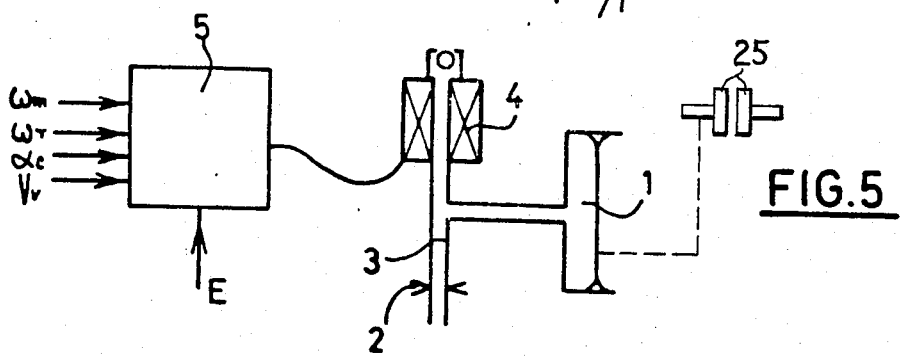
FIG. 5 is a schematic diagram of this supply of the cylinder by the modulating solenoid valve.
Figure 4:
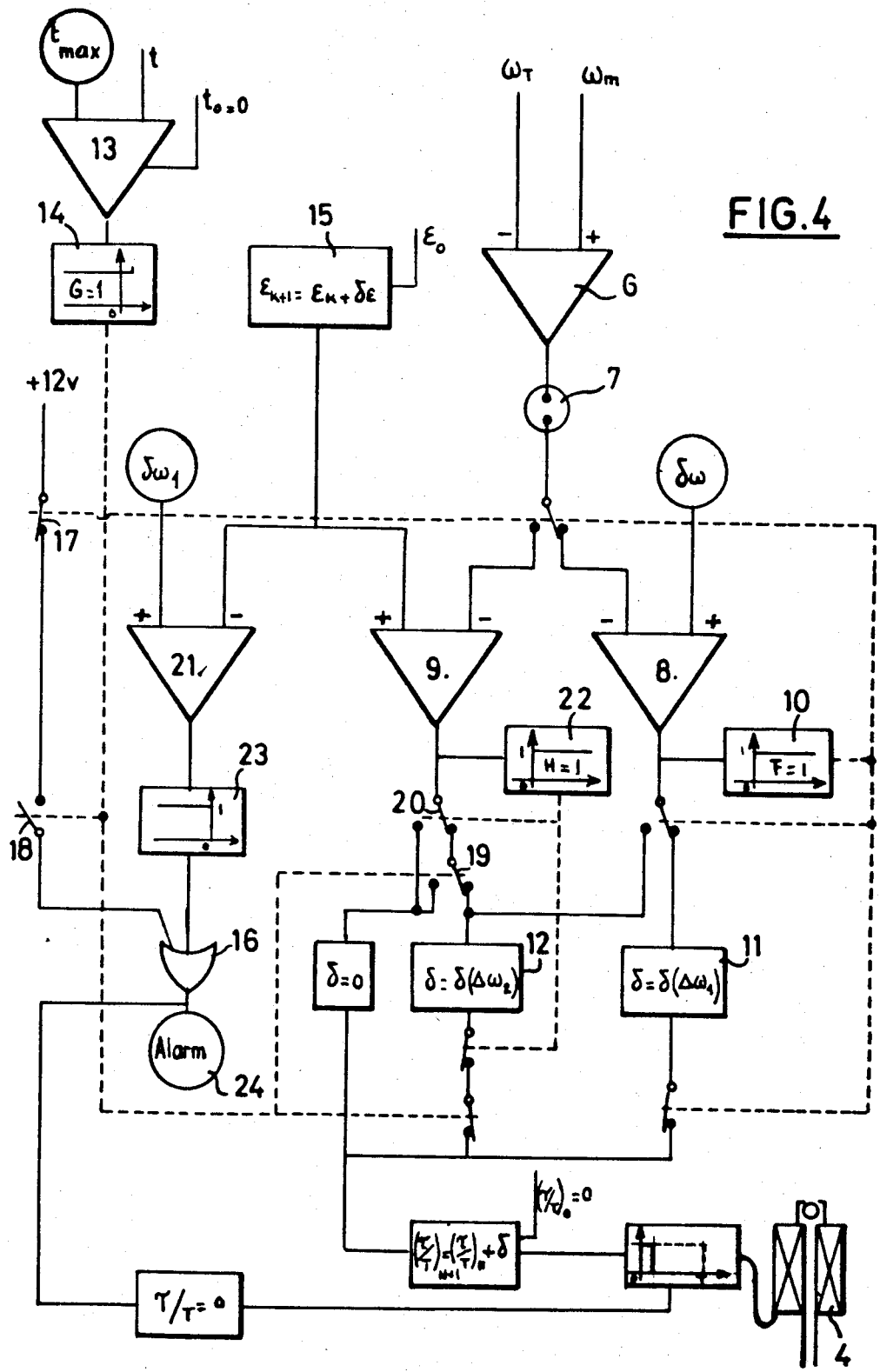
FIG. 4 is an electrical schematic diagram of an embodiment of the invention.

According to the present invention, the oil of cylinder 1 passes through a stationary restriction 2 placed on oil intake line 3, the instantaneous pressure downstream from restriction 2 being controlled by a suitable pressure modulator 4, of the type having a closed position in the absence of a control current. The pressure modulator can advantageously, but not in a limiting way, be a ball or core solenoid valve supplied by a periodic signal with a variable cyclic ratio, according to a process known in the art. Control of the variation of the cyclic ratio synthesized by an electronic package 5, whose schematic diagram is shown to FIG. 4, makes it possible to modulate the supply pressure of cylinder 1 according to the characteristics shown in FIG. 3. The resultant position of the cylinder acts to control the mating of linings 25. Package 5 receives as input signals:

signal E coming from the driver, for putting the stop disengagement device into operation;

engine speed signal $\omega_m$;

turbine speed signal $\omega_T$;

the position $\alpha_c$ of the element for regulating the fuel delivery in the engine;

vehicle speed signal $V_v$;

Comparison circuit 6 produces signal $\Delta\omega = \omega_m - \omega_T$ which is then sampled either at rate f1 or at rate f2 (greater than or equal to f1) by sampler 7.

Discrete values of $\Delta\omega$ thus obtained are sent either to comparison circuit 8 or to comparison circuit 9, depending on whether the logic magnitude F, defined below, is 0 or 1.

Comparison circuit 8 produces signal $\Delta\omega_1 = \delta\omega - \Delta\omega$, where $\delta\omega$ is a slippage value corresponding to point C of FIG. 1, intermediate between points B and D. Threshold relay 10 delivers logic variable F which is 1 or 0 depending on whether $\Delta\omega_1$ is negative or positive. If $F = 0$, the signal $\Delta\omega_1$ is directed to function generator 11 which produces a function $\delta(\Delta\omega_1)_N$. This function $\delta(\Delta\omega_1)_N$ serves to correct cyclic ratio $\tau/T$ of the control signal of modulating solenoid valve 4 according to the relation $$(\tau/T)_{N+1} = (\tau/T)_N + \delta(\Delta\omega_1)_N$$

where N refers to the Nth sampling period performed at frequency f1. By way of nonlimiting example, it is possible to take:

$$\delta(\Delta\omega_1) = N_1 + N_2\Delta\omega_1$$

which achieves a servocontrol with constant and proportional return. Graphically, the phase corresponding to F=0 is interpreted as the change of the position of the cylinder between points D and C of FIG. 1, which induces the slippage $\Delta\omega$ between points R and P of FIG. 2.

Figure 2:
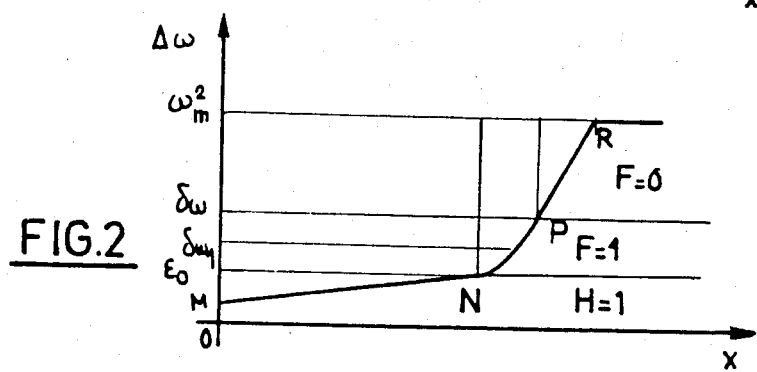
FIG. 2 is a graph of the change in the amount of slip of the coupling element as a function of the travel of the cylinder of the input element, with the vehicle stopped, the engine idling and in gear.

After the first detection of $\Delta\omega_1>0$, i.e., F=1, the signal is directed to comparison circuit 9 which then produces a new signal $\Delta\omega_2=\epsilon_0-\Delta\omega$, where $\epsilon_0$ is the value of slippage $\Delta\omega$ at point N of FIG. 2, and the sampling frequency becomes $f2 \geq f1$. If the logic variable G, which will be defined later, has the value 0, signal $\Delta\omega_2$ is directed to function generator 12 as long as $\Delta\omega_2<0$, value 0 being attached to a new logic variable H representing the state of threshold relay 22 if $\Delta\omega_2<0$, and the value 1, if $\Delta\omega_2>0$. As long as H has the value 0, i.e., if $\Delta\omega$ is greater than $\epsilon_0$, generator 12 produces a function $\delta'(\Delta\omega_2)$ which serves to correct cyclic ratio $\tau/T$ of the control signal of modulating solenoid valve 4 according to the relation:

$$(\tau/T)_{K+1} = (\tau/T)_K + \delta'(\Delta\omega_2)_K$$

where K refers tp the Kth sampling period performed at frequency f2.

By way of nonlimiting example, it is possible to take:

$$\delta'(\Delta\omega_2) = K'_1 + K'_2\Delta\omega_2,$$

which achieves a servocontrol with constant and proportional return. $K'_1<K_1$, $K'_2<K_2$ is selected which corresponds to a fine approach phase.

On the other hand, as soon as H=1, i.e., if $\Delta\omega$ becomes less than $\epsilon_0$, the correction $\delta'$ of the cyclic ratio is taken as equal to zero as a result of contact 20 (which moves to the left when H=1) and time t defined in the following § is reset to zero; the pressure in the cylinder is thus kept constant and the cylinder is immobilized in the vicinity of point B.

At the moment the stop disengagement device is put in operation, elapsed time t is begun to be metered. If, at the end of a time fixed in advance $t_{max}$, the operating state characterized by value 1 of logic variable H is not reached, signal $t_{max}-t$ produced by comparison circuit 13 causes threshold relay 14 to rotate which corresponds to logic variable G such that:

.G=1 if t>$t_{max}$

.G=0 if t<$t_{max}$

If simultaneously G=1 and F=0 (cylinder positioned between points C and D of FIG. 1 and t>$t_{max}$), a warning indicator 24 is switched on through contacts 17 (closed if F−0) and 18 (closed if G=1) and OR circuit 16.

As a safety measure, it is optionally possible then to take $\tau/T=0$, so as to prevent slippage under the considerable torque of the input element of the transmission.

If simultaneously G=1, F=1 and H=0 (cylinder positioned between points B and C of FIG. 1 and t>$t_{max}$), the correction $\delta$ of the cyclic ratio is set equal to zero as a result of contact 19 (to the left when G=1). The pressure in the cylinder is thus kept constant and the cylinder is immobilized. Function generator 15, initialized at the value $\epsilon=\epsilon_0$ corresponding to the value of slippage $\Delta\omega$ at point N of FIG. 2, then delivers a value $\epsilon$ incremented by $\delta\epsilon$ at each sampling. The new value of $\epsilon$ is then compared at each cycle to an intermediate a limit value $\delta\omega_1$ between $\epsilon_0$ and $\delta\omega$ by comparison circuit 21 and threshold relay 23.

If $\delta\omega_1-\epsilon$ becomes negative before H=1 (i.e., before $\epsilon-\Delta\omega$ becomes positive), indicator 24 is switched on and optionally it is then possible to take $\tau/T=0$ so as to prevent slipping under the considerable torque of the input element. If H=1 occurs first, the incrementing of 15 is stopped and time t is reset to zero.

The two typical sequences which can occur are the following:

Neutral/Automatic passage when stopped

This sequence corresponds to the filling under modulated pressure of cylinder 1.

Initially, the operating point is point M of FIG. 2. Therefore, H=1 and $\tau/T=0$. Therefore, the cylinder is filled under full pressure until mating point N of the friction linings is reached. After passing point N, the modulating solenoid valve is opened more and more, the filling is then done under decreasing pressure. Depending on the adjustments adopted, the travel of the cylinder can pass or not point C of FIG. 1 (corresponding to slippage $\delta\omega$), then the cylinder returns backward to stabilize itself in the vicinity of point B of FIG. 1 (corresponding to value $\epsilon_0$ of the slippage) if the mechanical conditions for operating the cylinder are normal. If, for any reason, the drag torque at point B is greater than normal and causes slipping greater than the nominal value $\epsilon_0$, the stop disengagement operation is nevertheless allowed as long as the slippage at mating does not exceed limit value $\delta\omega_1$.

In the opposite case, an anomaly is indicated and it is optionally possible to eliminate the stop disengagement by resetting $\tau/T$ to zero.

Disengaging the transmission at the end of deceleration of the vehicle

This sequence corresponds to the partial emptying of cylinder 1 with control of the pressure by the modulating solenoid valve. The operating point at the initialization of the sequence is point D of FIG. 1. The emptying of cylinder 1 is done through solenoid valve 4 which opens more and more and, from point E of FIG. 1, the input element of the transmission begins to slip.

Because of the choice of the coefficients $K_1$ and $K'_1$, $K_2$ and $K'_2$, the drop in pressure in cylinder 1 is rapid from D to C, slower and at a smaller incrementing step from C to B. If the mechanical conditions for operating the cylinder are normal, the latter is stabilized at a position in the vicinity of point B, otherwise a slightly degraded operation corresponding to a maximum slipping $\delta\omega_1$ is tolerated, or even the stop disengagement is eliminated by indicating an anomaly, in the same manner as in the previously described sequence.

If the order for stop disengagement ceases, whether signal E disappears (order coming from the driver) or $\alpha_c \neq 0$ (the driver accelerates again to start off again), the $\tau/T=0$ is set and modulating solenoid valve 4 is closed. The cylinder is thus filled under the action of the full pressure of the line. If, in this circumstance, it is desired to improve the gradualness of the engaging of the torque, it is optionally possible to provide a progressive law for return to zero of $\tau/T$ from its value at the moment the stop disengagement order disappears.

Obviously, numerous modifications and variations of the present invention are possible in light of the above teachings. It is therefore to be understood that within the scope of the appended claims, the invention may be precticed otherwise than as specifically described herein.

What is claimed as new and desired to be secured by Letters Patent of the Unites States is:

1. A control device for controlling the hydraulic pressure of a hydraulic actuator of a transmission, said actuator including a cylinder and mating linings, comprising:

a controller for producing a control signal having a first input for receiving an engine speed signal $\omega_m$, a second input for receiving a turbine speed signal $\omega_t$, a third input for receiving an engine load signal $\alpha_C$, a fourth input for receiving a vehicle speed signal $V_v$, a fifth input for receiving an enabling input E, and an output for transmitting said control signal;

a pressure modulator connected to said output of said controller, said modulator being controlled by said control signal and closed by a lack of current on said output of said controller;

said control signal being a function of the measurement of the slippage $\Delta\omega = \omega_m - \omega_t$ when $\alpha_C$ and $V_v$ are less than preset threshold values, said control signal causing said pressure modulator to position said cylinder so that said linings mate;

said controller including a first comparator and a second comparator, said first comparator comparing $\Delta\omega$ to a first threshold $\delta\omega$ and said second comparator comparing $\Delta\omega$ to a second threshold $\epsilon$, whereby a large gain correction signal $\delta = \delta(\Delta\omega_1)$ is generated to modify said control signal if $\Delta\omega_1 = \delta\omega - \Delta\omega$ is negative, a small gain correction signal $\delta = \delta(\Delta\omega_2)$ is generated if $\Delta\omega_1$ is positive and $\Delta\omega_2 = \epsilon - \Delta\omega$ is negative, and a zero gain correction signal is generated if $\Delta\omega_1$ and $\Delta\omega_2$ are positive.

2. A control device according to claim 1 wherein said controller further comprises an alarm, a timing means for producing a time signal t indicative of the length of time said actuator has been actuated and a third comparator for comparing with a maximum time $t_{max}$;

whereby if $t > t_{max}$:

if $\Delta\omega > \delta\omega$, said alarm is actuated and full pressure is supplied, if $\epsilon < \Delta\omega < \delta\omega$, said control signal is modified to a third threshold $\delta\omega_1$ where $\epsilon < \delta\omega_1 < \delta\omega$;

if $\Delta\omega > \delta\omega_1$, said alarm is actuated and full pressure is supplied if $\Delta\omega < \delta\omega_1$, $\Delta\omega$ becomes the new threshold and t becomes zero.

3. A control device according to claim 1 wherein a return to full supply pressure is made according to a predetermined time function.

* * * * *